(12) United States Patent
Moradi

(10) Patent No.: US 11,041,403 B2
(45) Date of Patent: Jun. 22, 2021

(54) GAS TURBINE ENGINE, PART THEREOF, AND ASSOCIATED METHOD OF OPERATION

(71) Applicant: PRATT & WHITNEY CANADA CORP., Longueuil (CA)

(72) Inventor: Niloofar Moradi, Côte Saint-Luc (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 17 days.

(21) Appl. No.: 16/699,041

(22) Filed: Nov. 28, 2019

(65) Prior Publication Data
US 2020/0332676 A1 Oct. 22, 2020

Related U.S. Application Data

(63) Continuation-in-part of application No. 16/385,428, filed on Apr. 16, 2019, now Pat. No. 10,822,987.

(51) Int. Cl.
*F01D 25/12* (2006.01)
*F02C 7/12* (2006.01)

(52) U.S. Cl.
CPC .............. *F01D 25/12* (2013.01); *F02C 7/12* (2013.01); *F05D 2220/32* (2013.01); *F05D 2260/2214* (2013.01)

(58) Field of Classification Search
None
See application file for complete search history.

(56) References Cited

U.S. PATENT DOCUMENTS

| | | | |
|---|---|---|---|
| 6,379,528 B1 | 4/2002 | Lee et al. | |
| 6,582,197 B2 | 6/2003 | Coulson | |
| 7,553,128 B2 | 6/2009 | Abdel-Messeh et al. | |
| 9,255,491 B2 | 2/2016 | Blaney et al. | |
| 2002/0066273 A1 | 6/2002 | Kitamura et al. | |
| 2013/0193214 A1* | 8/2013 | Margulis | G06K 19/063 235/489 |
| 2020/0233377 A1* | 7/2020 | Weston | G03H 1/0808 |
| 2020/0394399 A1* | 12/2020 | Gilbert | G06K 9/4661 |

FOREIGN PATENT DOCUMENTS

EP    3205822    8/2017

OTHER PUBLICATIONS

Vdovin Ra et al: "Paths of Improving the Technological Process of Manufacture of GTE Turbine Blades", IOP Conference Series: Materials Science and Engineering, vol. 142, Aug. 1, 2016 (Aug. 1, 2016), p. 012073, KP055792171, GB ISSN: 1757-8981, DOI: 10.1088/1757-899X/142/1 /012073 Retrieved from the Internet: URL:http:// stacks.iop.org/1757-899X/142/i= 1 la=0 12073 ?key= crossref. 03b87b9078177ebafd1b895ccd43c890.

(Continued)

*Primary Examiner* — Michael Lebentritt
(74) *Attorney, Agent, or Firm* — Norton Rose Fulbright Canada LLP

(57) ABSTRACT

The gas turbine engine part can have a heat sink portion having a surface having a plurality of protrusions distributed over an area of the surface, the protrusions projecting away from the surface and including protrusions being adjacent to one another and collectively forming an identifier. A flow of cooling air can be directed to the protrusions forming the identifier to cool the part.

20 Claims, 8 Drawing Sheets

(56) References Cited

OTHER PUBLICATIONS

Anonymous: "3D Printed turbine blade—Industrial Design Fundamentals 2016", Feb. 23, 2016 (Feb. 23, 2016), pages 1-2, XP055792168, Retrieved from the Internet: URL:https:Mdf2016cmu.wordpress.com/2016/02/23/3d-printed-urbine-blade/ [retrieved on Apr. 1, 2021].
Anderson Goehrke Sarah: "Jan. 4, 2021 Siemens Advancing Additive Manufacturing: Exclusive Interview, Part One—Leveraging Expertise -3DPrint.com I the Voice of 3D Printing / Additive Manufacturing Siemens Advancing Additive Vlanufacturing: Exclusive Interview, Part One -Leveraging Expertise Popular Staries @Bullet by Sarah an" Apr. 5, 2018 (Apr. 5, 2018), pp. 1-7, XP055792172, [retrieved on Apr. 1, 2021].

* cited by examiner

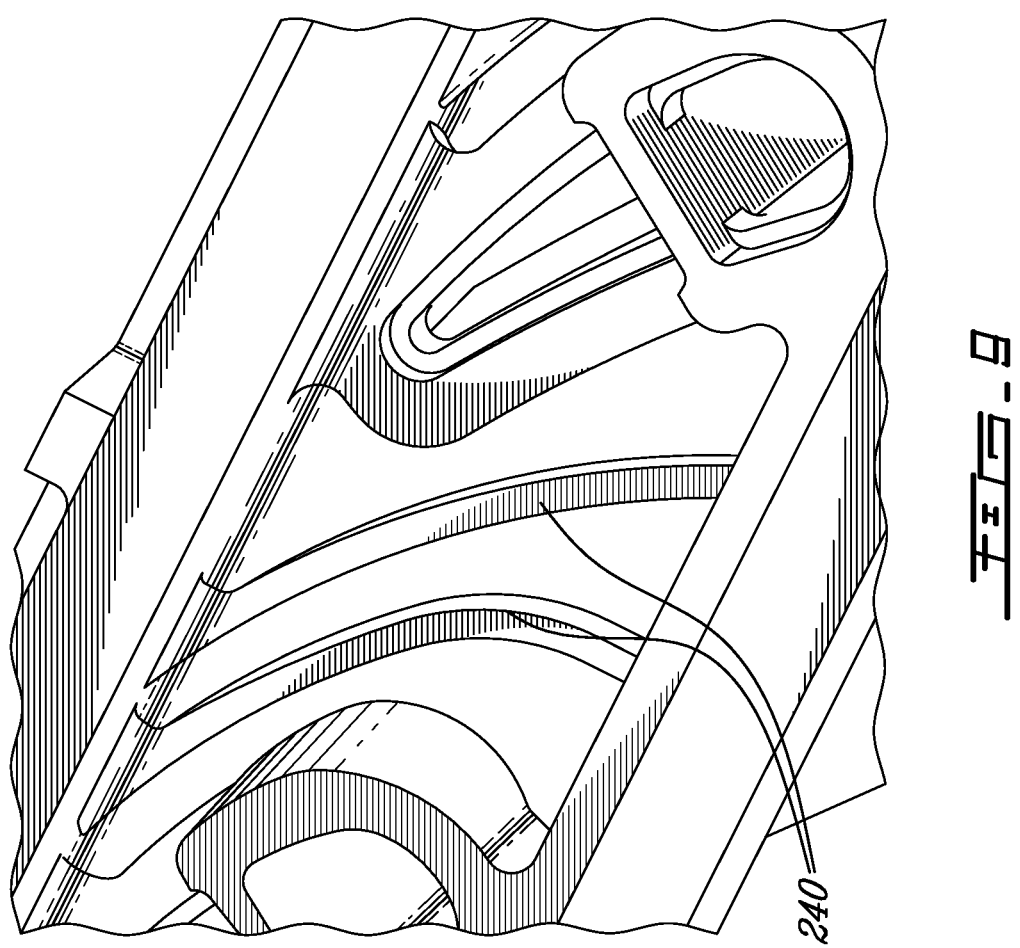

GAS TURBINE ENGINE, PART THEREOF, AND ASSOCIATED METHOD OF OPERATION

CROSS-REFERENCE TO RELATED APPLICATIONS

This application claims priority of U.S. application Ser. No. 16/385,428, the entire contents of which are incorporated by reference herein.

TECHNICAL FIELD

The application relates generally to air-cooling of hot surfaces in a gas turbine engine and, more particularly, to heat-exchange promoting structures on a hot surface of a gas turbine engine.

BACKGROUND OF THE ART

In gas turbine engines, some components are subjected to significant heat. This is the case, for instance, in combustors and turbine components, with high-pressure turbine stators, in particular, being exposed to the flow of high-temperature gas coming from the combustion chamber. To avoid thermally-induced degradation, the surface of such components which is opposite to the face delimiting the gas path can be subjected to cooling air, which can be bled from the compressor.

Several factors can affect heat transfer rate, and thus the cooling efficiency, such as cooling air flow rate, the flow configuration, and the geometry of the surface subjected to the cooling air flow. However, many factors must also be taken into consideration when designing gas turbine components, such as manufacturability, costs, weight, etc., and there remained room for improvement.

SUMMARY

In one aspect, there is provided a gas turbine engine part, the part comprising a heat sink portion having a surface having a plurality of protrusions distributed over an area of the surface, the protrusions projecting away from the surface, some of the protrusions being adjacent to one another and collectively forming an identifier, and other ones of the protrusions not forming the identifier.

In another aspect, there is provided a method of cooling a gas turbine engine part having a heat sink portion having a surface having a plurality of protrusions distributed over an area of the surface, the protrusions projecting away from the surface, some of the protrusions collectively forming an identifier, the method comprising : directing a flow of cooling air into contact with the plurality of protrusions.

In another aspect, there is provided a method of constructing a computer aided design (CAD) model of a part, comprising: determine (e.g. using suitable modeling techniques) a required number and/or area of heat transfer protrusions to provide a target heat transfer rate, and use at least some of the required area and/or protrusions to define a shape of an identifier.

In a further aspect, there is provided a gas turbine engine comprising a main gas path extending in serial flow communication across a compressor section for pressurizing air, a combustor for mixing fuel into the air, igniting the fuel, and generating hot combustion gases, and a turbine section for extracting energy from the combustion gases, the turbine section having a component receiving heat from the hot combustion gases, the turbine component having an annular surface opposite the main gas path, the annular surface having a plurality of protrusions distributed over an area of the annular surface, the protrusions projecting away from the surface, at least some of the protrusions collectively forming an identifier; and a bleed air path for directing a flow of pressurized air from the compressor into contact with the annular surface and the protrusions.

DESCRIPTION OF THE DRAWINGS

Reference is now made to the accompanying figures in which:

FIG. 9 is an oblique view of another variant of protrusions of a heat sink portion.

DETAILED DESCRIPTION

Figure 1:
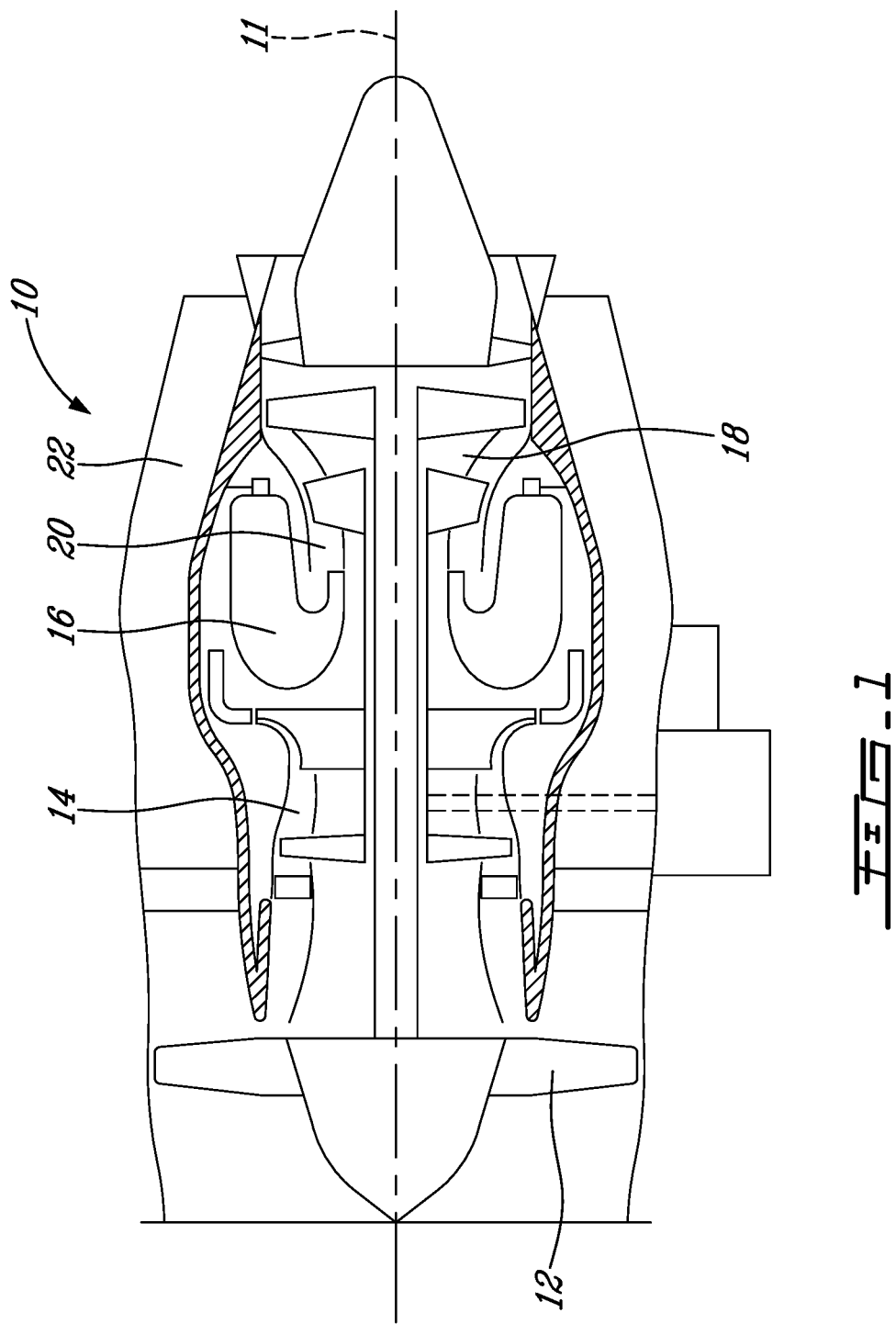
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases, with rotary components rotating around a main axis 11. A gas path 20 can thus be said to extend through the engine core, successively across the compressor 14, combustor 16 and turbine 18 sections. In the specific case of a turbofan engine, a bypass path 22 further extends around the core engine, in a bypass duct, but other engines have other gas path configurations and many types of engines do not have a bypass path.

Several components of the gas turbine engine 10 can be subjected to intense heat, posing significant design constraints such as choice of materials which can withstand such heat, their associated durability, weight and costs, as well as heat mitigation strategies. This is particularly true, for instance, in the case of some parts of the combustion chamber 16 and of the turbine section 18. The turbine section 18, for instance, can include a succession of stators and rotors. The closest a stator or rotor is to the outlet of the combustion chamber, the more it can be exposed to high energy/high temperature fluid, and the stator immediately downstream of the combustion chamber, which can be referred to as a high-pressure, or HP stator, can thus be particularly affected by high temperatures.

Components exposed to high temperature gas can be cooled to evacuate heat and control their temperature. This can be done by bleeding cooling air from the compressor section 14, for instance, and directing a flow of the cooling air against a surface of the component or part which faces away from the gas path (i.e. a radially outer face if the gas path is located radially inwardly of the component—such as an outer shroud, or a radially inner face if the gas path is located radially outwardly of the component), in a manner to continuously evacuate heat received by the component via the high temperature gas circulating in the gas path.

Providing protrusions in the surface which is exposed to the cooling air flow can increase the heat exchange rate, and thus improve cooling efficiency while other variables remain the same. Such protrusions can be referred to as fins. Fins traditionally used on heat sinks are typically long and thin, but such long fins can be difficult to integrally form in cast components made of heat-resistant alloys, or otherwise be undesired, such as due to durability or weight for instance, or even adaptability to the specific cooling flow configuration, and it was found that even fins which have a relatively low height could provide a substantial increase in cooling efficiency. This can be the case when the flow of cooling air is directed to impinge against the surface and protrusions, for instance. It was found that providing a plurality of protrusions distributed over an area of the surface which is exposed to cooling fluid could be desirable in some gas turbine parts which are otherwise exposed to high temperatures. Such protrusions can have various shapes. In one embodiment which will be described below in greater detail, and perhaps best illustrated in FIG. 5, the protrusions 40 have a cruciform (or cruciate) shape on the plane of the surface, and can be said to have an cruciform cross-section taken transversally to the direction of projection, or can be said to form an X-shape when viewed from a point of view located perpendicular to the surface.

Part marking is a requirement in the case of many gas turbine engine components. Part marking can involve providing an identifier, which can include a part number, a serial number, and/or a class number, to name some examples, on the part, such that information about the part can be retrieved via the identifier. The identifier can be in the form of a sequence of alphanumerical characters, for instance. Integral part marking refers to providing such an identifier integrally during manufacture of the part. For instance, the mould can include indentations in the form of alphanumerical characters forming an identifier which leave the identifier "printed", onto the part when the part is removed from the mould, as opposed to, say, an identifier which is affixed or otherwise formed onto the part subsequently to the moulding operation. Integral marking can be preferred for various reasons, one of these is that since it associates the identifier to the part at the earliest possible moment in time, there is no room for tampering or confusion. Integral marking can either be provided in the form of a recessed identifier, or of a protruding identifier. Since the structural integrity of gas turbine components are carefully monitored to reduce weight, recessed identifiers in an otherwise weight-optimized component can result in structural weakness. Weight can be added to an otherwise weight-optimized component to provide an area for a recessed identifiers, but this necessarily results in added weight, which is particularly undesirable in an aircraft gas turbine engine. Accordingly, a protruding integrally-marked identifier can represent a lesser amount of added weight than a recessed integrally-marked identifier, even though the protrusions forming the identifier represent a certain amount of weight themselves.

It was found that the side-effect of added weight associated to the presence of a protruding integrally-marked identifier could be alleviated in embodiments of gas turbine engine components which otherwise have protuberances designed to increase cooling efficiency formed in a surface exposed to a cooling air flow. Indeed, the protruding integrally-marked identifier can, in such a scenario, be used to replace some or all of the protuberances which would otherwise have been added for the sole purpose of improving the heat exchange efficiency. Indeed, the presence of a protruding integrally-marked identifier can improve cooling efficiency when exposed to a cooling fluid flow, by contrast with a flat surface, and it is even possible to specifically select features of the integrally marked identifier, such as font size, height, font line width, for the specific purpose of optimizing the engine from the point of view of cooling efficiency while still allowing the integrally marked identifier to retain its identification functionality.

Figure 2:
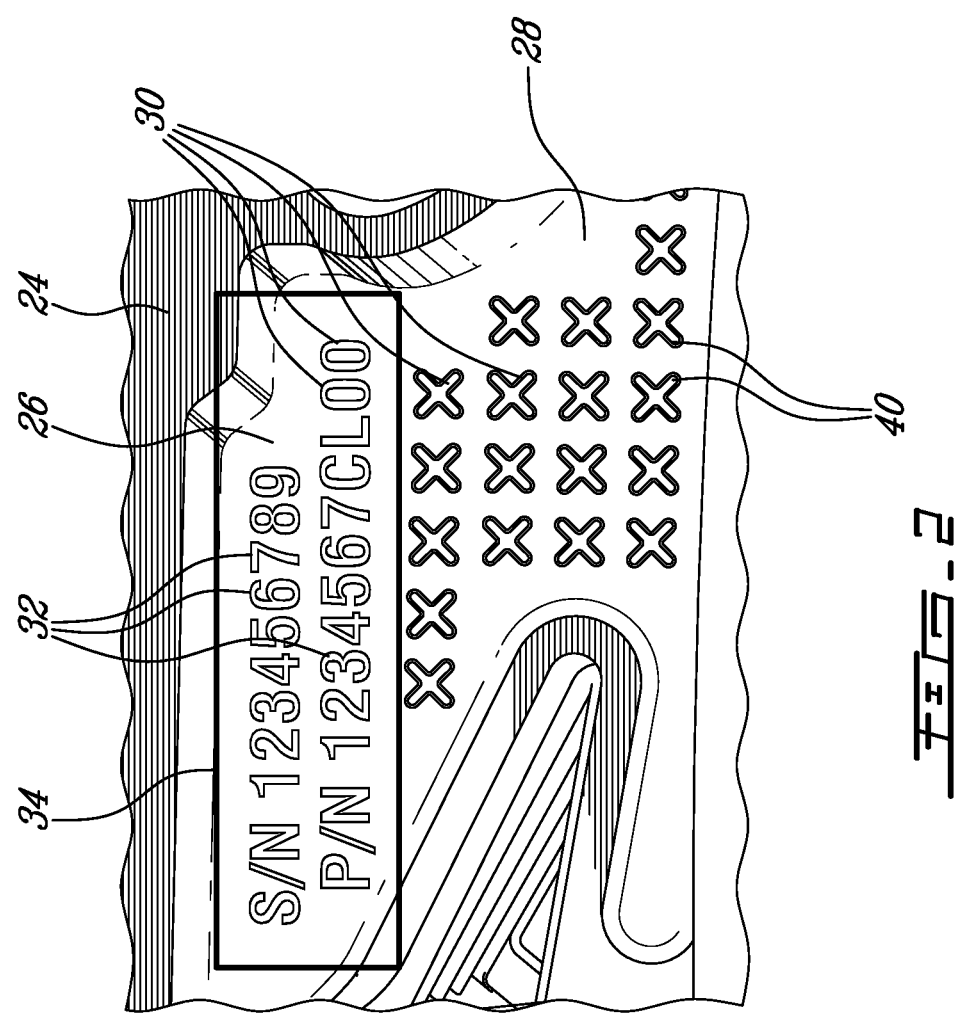
FIG. 2 is a top plan view of a heat sink portion of a part of the gas turbine engine.

FIG. 2, for instance, shows an example of a gas turbine engine part 24 which has a heat sink portion 26 configured to transfer heat from the part 24 into cooling air circulating next to it while also performing its other functions which can be structural, for instance. The heat sink portion 26 has surface 28 which is relatively flat apart from a plurality of protrusions 30. The protrusions 30 are distributed over an area of the surface 28, and project away from the surface (i.e. in the illustration of FIG. 2, the protrusions project at least partially towards the viewer). In the embodiment of FIG. 2, a number of these protrusions 40 are optimized purely for the functionality of heat transfer, while also taking into consideration the effect of weight, structure, etc. In this specific embodiment, this was achieved by choosing a cruciate (cross-shaped) shape, when viewed normal from the plane of the protrusions 40, which offers multi-directionality relative to an impinging cooling jet. These latter protrusions 40 are evenly distributed in this embodiment. These protrusions 40 could have otherwise extended over a greater area of the surface 26, but in this embodiment, another number of the protrusions 32 have other shapes, occupy another portion of the area of the surface, and collectively form an identifier 34. The shape of these other protrusions 32 are more specifically alphanumerical characters in this specific example. The identifier 34, in this embodiment, includes a plurality of protrusions 32 forming alphanumerical characters, and includes a serial number preceded by the marking S/N, a part number preceded by the marking P/N, and a class number preceded by the marking CL, which is a typical requirement of integral part marking. It will be understood that various alternate forms of identifiers can be used in alternate embodiments, such as trade-mark(s), human recognizable symbol(s), machine-readable symbol(s) (e.g. QR codes etc). The font size, height (normal to the surface 26), font line width (i.e. the width of the lines which constitute the alphanumerical characters), and spacing between characters can be selected in a manner to favor the effect of the protrusions they form on heat transfer. The optimization of the characteristics of the protrusions forming the identifier in view of heat transfer efficiency can be adapted to the specific context of the gas turbine engine part.

This technique can be used on a wide variety of models of gas turbine engines, and a variety of gas turbine engine parts, with a turbine stator parts such as inner shrouds, outer shrouds, shroud segments (also called blade outer air seals) and combustor panels, forming a few potential examples. Some examples will be presented in greater detail below for the purpose of illustration.

Figure 3:
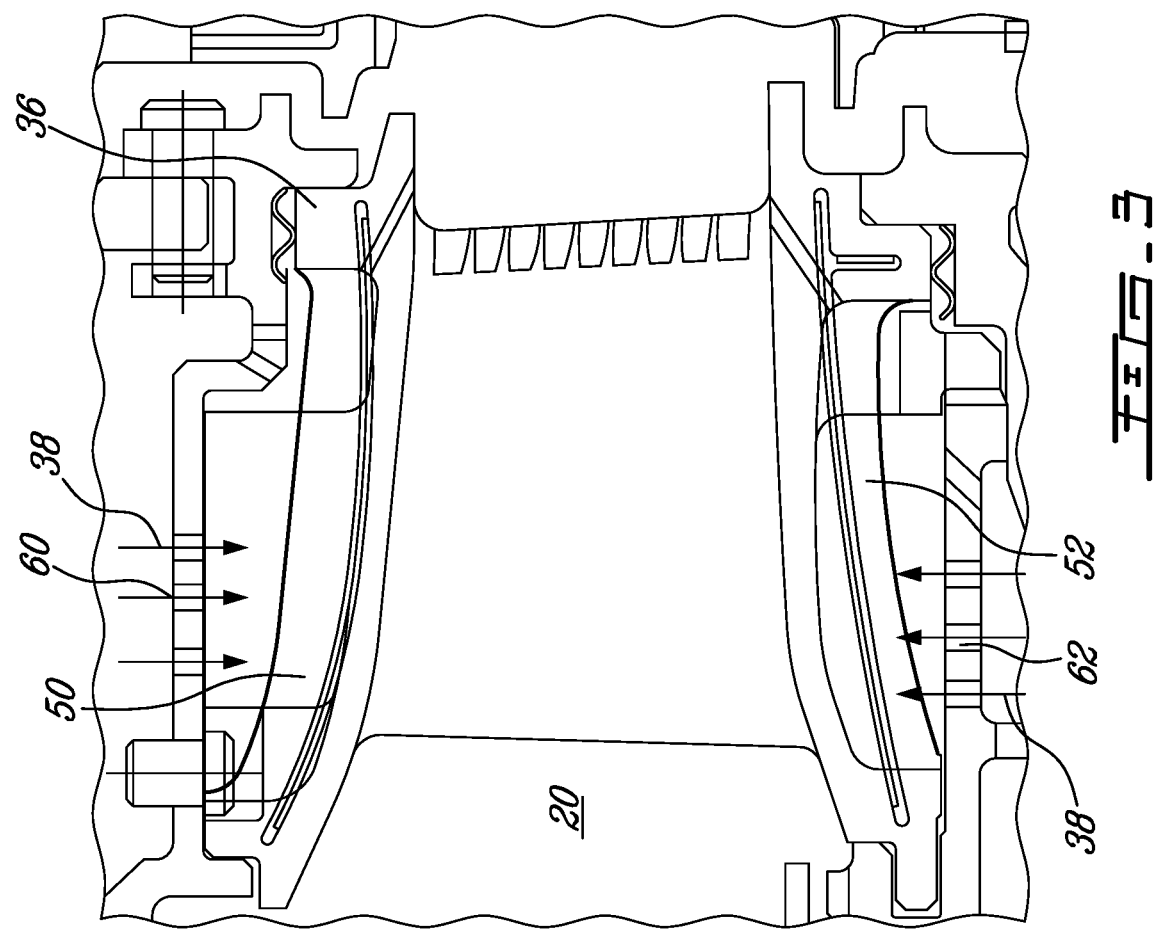
FIG. 3 is view taken along an axial-radial plane, showing a high pressure turbine stator having a heat sink portion.

FIG. 3 presents one embodiment representing a high pressure turbine stator 36, where the engine is configured in a manner to bring cooling air 38 into contact with a finned radially outer surface 50 of the outer shroud of the stator 36, and with a radially inner surface 52 of the inner shroud of the stator 36, while the radially-inner surface of the outer shroud, and the radially outer surface of the inner shroud, are exposed, to high temperature gas flow exiting the combustion chamber and circulating in the gas path 20. In such an embodiment, an identifier formed of a plurality of protrusions can be formed in the radially outer surface 50 of the outer shroud, in the radially inner surface 52 of the inner shroud, or both, for instance.

More specifically, in this specific example, the finned radially outer surface 50 of the outer shroud is housed within a cavity 92. One or more inlets 60 lead into the cavity, and are configured in a manner to direct cooling air jets onto the finned surface 50. Outlets 94 of the cavity are used to redirect the cooling air flow into the gas path subsequently to cooling the surface 50. The geometry of the cavity, relative position of the surface 50 and its cooling fins, the configuration of the inlets and outlets all affect the cooling air flow configuration within the cavity. Similarly, the finned inner surface 52 is also provided within a cavity with inlets and outlets directing cooling air flow in this embodiment.

Figure 4:
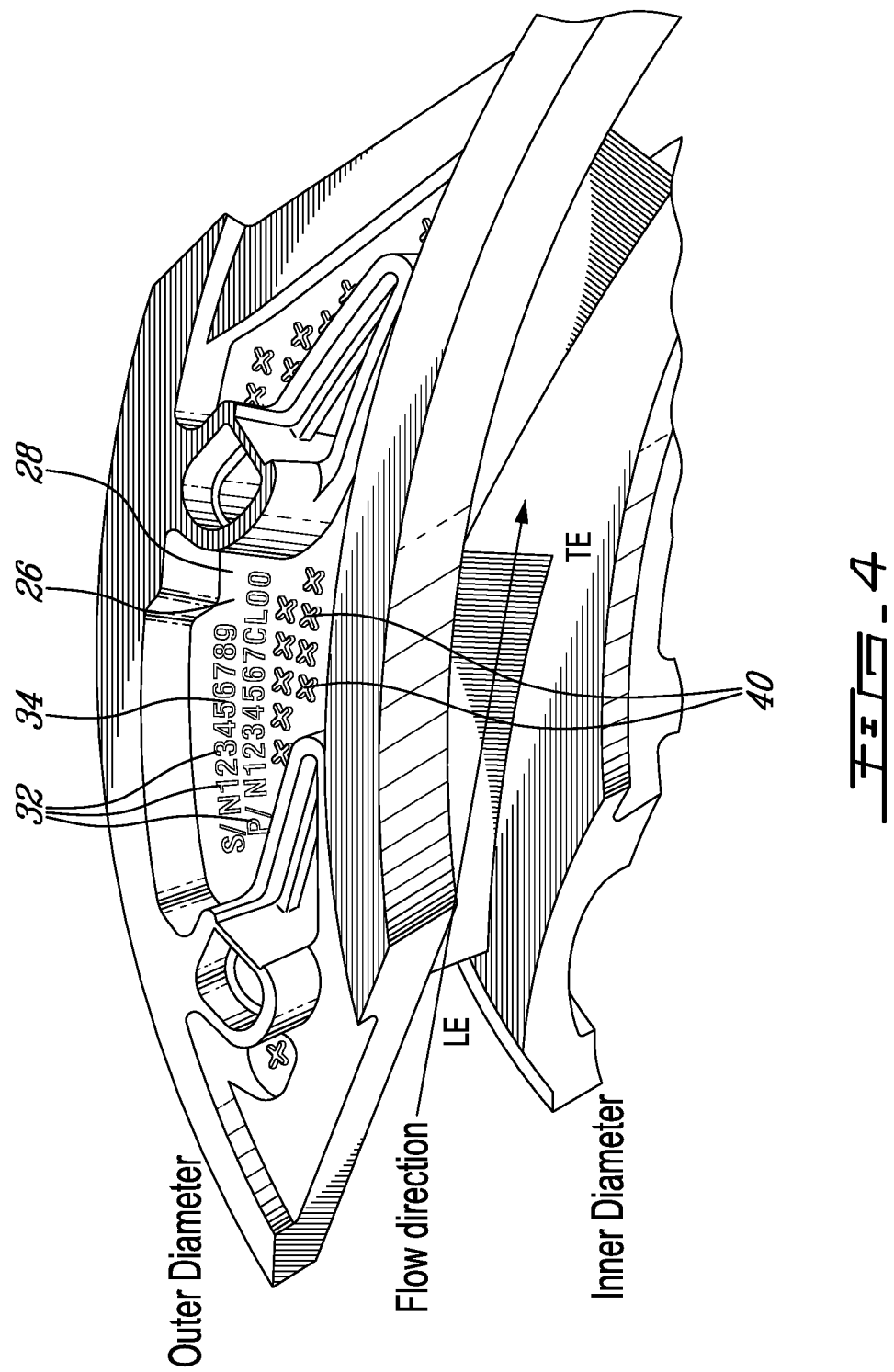
FIG. 4 is an oblique view, fragmented, of the high pressure turbine stator of FIG. 3.

Turning now to FIG. 4, the specific case of using an identifier 34 formed of a plurality of protrusions 32 formed in a radially outer heat sink portion 26 of an outer shroud is presented in fuller detail. The protrusions 32 in this case are identical to the protrusions 32 which were presented in FIG. 2, though it will be understood that they can change from one embodiment to another.

Turning back to FIG. 3, the cooling air 38 directed to the turbine stator outer shroud can be directed via an impingement cooling system, where high-speed air jets target the stator surface 50, 28, raising the heat transfer coefficient (HTC) in the process. To further increase cooling efficiency, the shroud surface may feature an array of protrusions or "fins" 32, 40 (HTC augmenters) to increase the cooled surface area and also increase local turbulence, which can energize the cooling flow. The integral part marking's location can be selected to integrate it to a heat transfer coefficient-increasing protrusion configuration used in combination with some means of providing cooling flow such as impingement cooling or film cooling, and font size and letter height can be optimized with a view of achieving satisfactory heat transfer. The protrusions, which can be referred to as "cooling fins", can be not only x-shaped, but any alphanumeric shape, or any other shape (squiggle, etc) to optimize the cooling characteristics. The protrusions can be multi-directional and adapted to work in a complex flow environment by design. The protrusions can be integrally cast on the outer shroud surface so as to avoid the requirement of subsequent machining, which can be relatively expensive.

Figure 5:
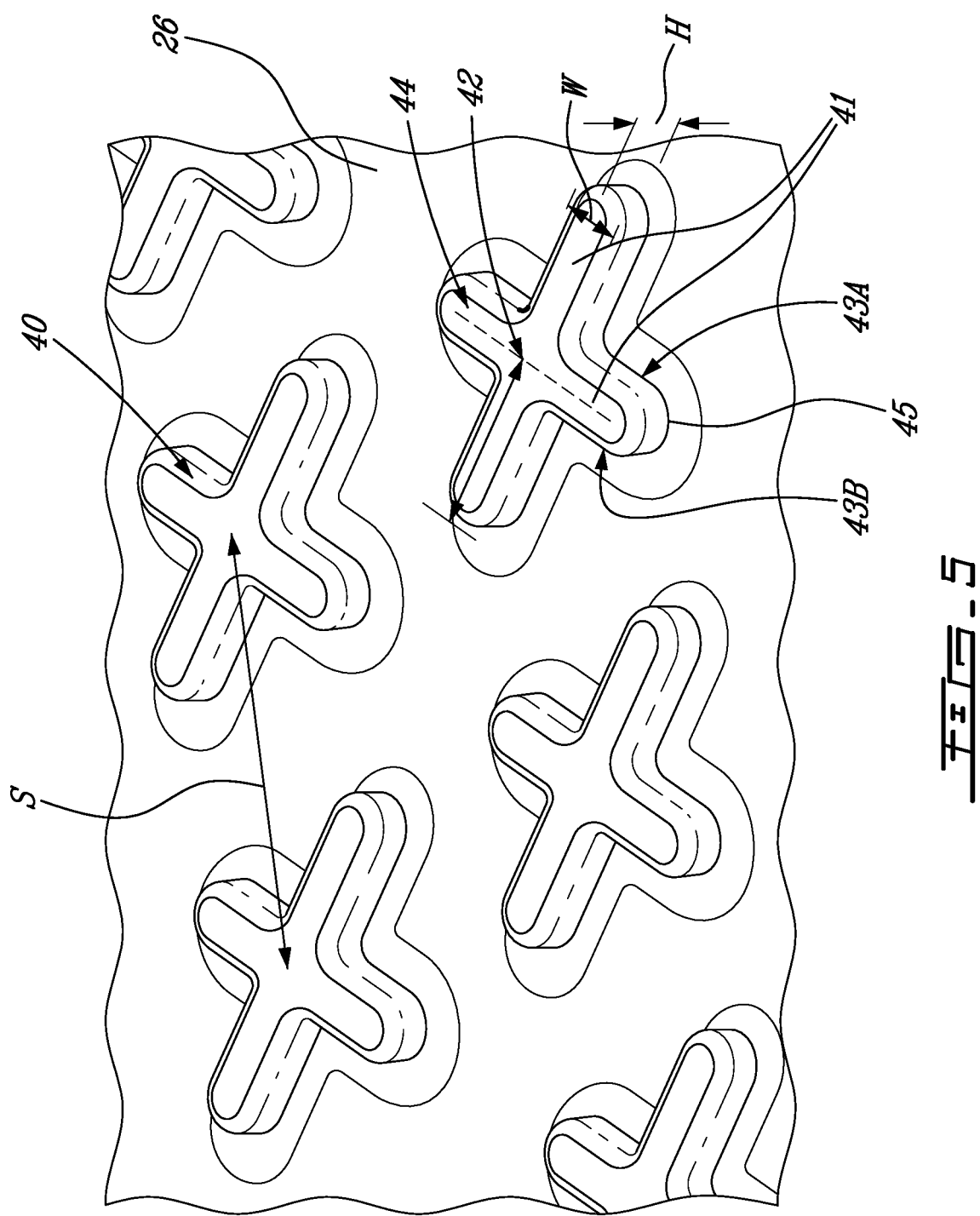
FIG. 5 is a close-up view of a portion of FIG. 4 showing protrusions of the heat sink portion.

In the specific embodiment shown in FIG. 4, the protrusions which are not used to form the identifier can have a multi-directional configuration, or stated differently have "flow-direction independent" features, which may be desirable in complex flow environment, for instance. Referring to FIG. 5, a close-up partial view of exemplary protrusions 40 are shown. Features of a single protrusion 40 are detailed below.

The protrusion 40 has a plurality of elongate members 41 in the form of straight legs having a length L, a width W, and a height H. The elongate members 41 intersect each other and extend away from a common location. In the embodiment shown, the protrusion 40 includes four elongate members 41 intersecting each other and extending in different directions away from a common point, which is defined in this embodiment by the center 42 of the protrusion 40. As illustrated, the protrusion 40 has a cruciform or cruciate cross-sectional shape when viewed in a plane that is normal to the protrusion axis of the protrusions 40. As noted above, the protrusions 40 extend away from the radially outer surface of the platform along the protrusion axis. This plane may be substantially parallel, and spaced apart from (or stated differently, extending over), the radially outer surface.

The protrusions 40 as shown include four elongate members 41 each extending in directions at 90° relative to an adjacent one of the elongate members 41. Upon impingement of the radially outer surface 26 having the plurality of protrusions 40, the cooling air C flow diffuses on the protrusions 40 such that the cooling air C flow may project along the elongate members 41 forming the cruciate protrusions 40 in opposite directions at the radially outer surface. In other embodiments, there may be more or less elongate members 41 forming the protrusion 40, with or without the same relative angle between adjacent ones of the elongate members 41. While in the embodiments shown the elongate members 41 intersect each other at a common location or center 42, other geometries (not shown) of protrusions 40 may be provided where the elongate members 41 may not all intersect at a common location, such as where one or more elongate members 41 do not irradiate from a same point than one or more others.

In this specific embodiment, all the elongate members 41 have the same shape and size. In other words, all the elongate members 41 have the same length L, height H and width W. The elongate members 41 may have different parameters, such as different length, height and/or width in other embodiments. In the depicted embodiment, the elongate members 41 extend straight. In other words, there is substantially no curvature along the length L of the elongate member 41, apart from curvatures of surfaces along the length L. This may be different in other embodiments, where, for instance, one or more of the elongate members 41 may be skewed along its length L or includes webs or "branches" extending from one or more sides of the elongate members 41 to form more complex networks or clusters of members extending outwardly away from the center 42 of the protrusions 40. The protrusions 40 on the entire radially outer surface are all oriented identically on the radially outer surface. Stated differently, the elongate members 41 of the protrusions 40 all extend in the same respective directions, where no protrusion 40 is rotated about its center 42 relative to an adjacent one of the protrusions 40.

In the depicted embodiment, each elongate member 41 is curved on its entire surface. Opposite sides 43A, 43B of an elongate member 41 have a concave section having a radius R1 from the base surface 26 which transitions in a convex section having a radius R2. Both radii R1, R2 may be identical or different, depending on the embodiment. Opposite sides 43A, 43B of an elongate member 41 emerge from the base surface 260 and follow a curved profile to converge at an apex 44 of the elongate member 41, where such apex 44 is rounded and devoid from flat surface. The apex 44 thus divides longitudinally a respective elongate member 41 into a first side 43A and a second side 43B extending along the length L of the elongate member 41. In the example shown, the first and second sides 43A, 43B are symmetrical along the apex 44 of the elongate member 41. The first and second sides 43A, 43B, or simply the elongate member 41, may be asymmetrical along the apex 44 in other embodiments.

In some embodiments, such as the depicted one, the longitudinal end 45 of an elongate member 41 may also or alternatively be rounded or curved. In other words, the first and second sides 43A, 43B of the elongate member 41 extend along the length L of the elongate member 41 and converge at the longitudinal end 45 of the elongate member 41 to form a smooth rounded end. As such, in the embodiment shown, any contour surfaces of the elongate member 41, and more generally in this embodiment the whole contour of the protrusion 40 has a curvilinear profile. The contour of the protrusion 40 may therefore define various sides or surfaces transitioning into one another in a combination of concave and convex surface sections.

In the embodiment shown, the protrusions 40 are shallow. The protrusions 40 protrude away from the base surface 260 a smaller distance in comparison with traditional (much longer) pin fins. In an embodiment, the protrusions 40 may have a ratio of height H to width W (H:W) between 6:5 and 5:6. In a particular embodiment, such ratio H:W is 1:1. Different ratios may be found in other embodiments. Protrusions 40 with such parameter may be less prone to break and/or easier to manufacture than traditional elongated pin fins with substantially higher profile.

Limiting the length L of the elongate members 41 may be desirable in some embodiments, as the furthest the elongate members 41 extend from the center 42 of the protrusion 40, the more uniaxial, rather than multi-directional, the cooling efficiency gains may become. In an embodiment, the length L of the elongate members 41 versus the height H of said elongate members 41 is 3:1. Such ratio may contribute to enhancing the cooling efficiency without substantially compromising manufacturability. Other ratios may be contemplated in other embodiments without substantially compromising manufacturability while increasing cooling efficiency of the platform 21 with the integrated protrusions 40 over a platform without such protrusions 40.

As mentioned above, the protrusions 40 are spaced apart from one another. A spacing S between adjacent protrusions 40 may be defined as a distance between the center 42 of adjacent protrusions 40. A correlation may be drawn between the spacing S and one or more dimensions of the protrusions 40 or elongate members 41 thereof. For instance, in an embodiment, a ratio of the height H over the spacing S (H:S) of the protrusions may be between 4:1 and 14:1. In a particular embodiment, the ratio H:S is 7:1. The ratio H:S may be different in other embodiments. Heat exchange may tend to decrease where such ratio is increased, i.e. decreased height H over the spacing S. With lower ratios, i.e. increased height H over the spacing S, some embodiments may still provide increased cooling efficiency, but higher protrusions may had some weight and may reduce manufacturability, for instance.

In some embodiments, heat transfer capabilities of these protrusions 40 may be substantially constant regardless of the direction of the cooling air C flow after the impingement cooling air jets have impinged upon the radially outer surface 26. Other suitable protrusion geometries may be used to effectively optimize heat transfer and/or optimize a surface-flow interaction.

The configuration of the protrusions 32 forming the identifier, including font size, font line thickness, height and/or roundness, for instance, can be generally based on the corresponding features described above in relation with the protrusions 40 which do not form part of the identifier.

Any suitable manufacturing techniques may be used to manufacture such a part. For instance, the component may be manufactured from a powder injection molding process, a process which involves creating an intermediary green part, i.e. a part including a solidified binder that holds a material powder together with the binder being removed before the part is in its final form. Many materials can be found suitable depending on the embodiment, but it can be desired to use a nickel or cobalt alloy in embodiments adapted for higher temperature environments.

Figure 7:
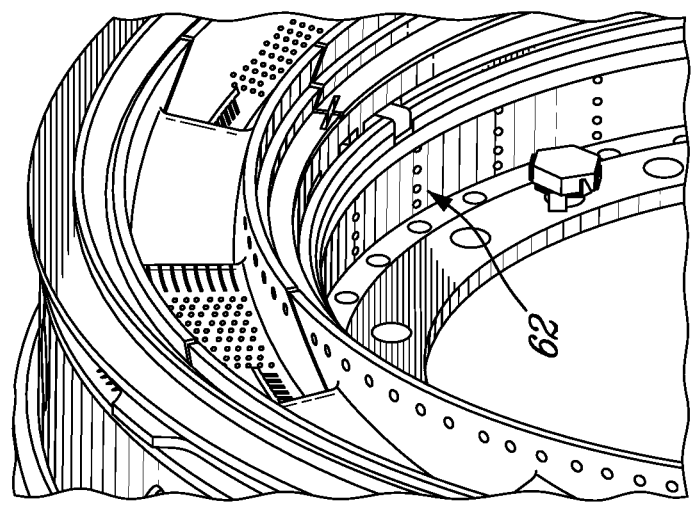
FIG. 6 and FIG. 7 are additional oblique views of the high pressure turbine stator of FIG. 3.
Figure 6:
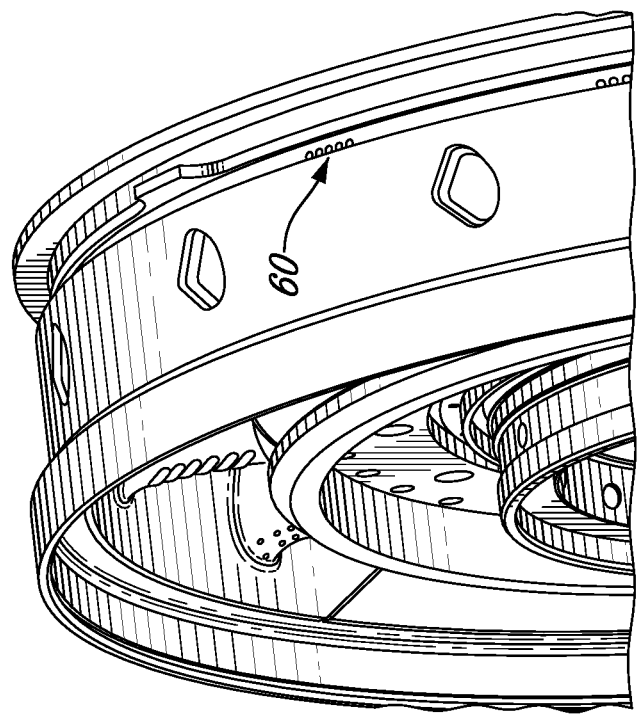

FIGS. 6 and 7 provide additional visual representation of how apertures 60, 62 in a component adjacent the heat sink portion, together with compressor bleed air conveyed into a plenum exposed to the apertures, can be used to form cooling air jets 38 directed against the heat sink portion, with FIG. 6 presenting OD impingement cooling apertures and FIG. 7 presenting ID impingement cooling apertures, respectively.

Figure 8:
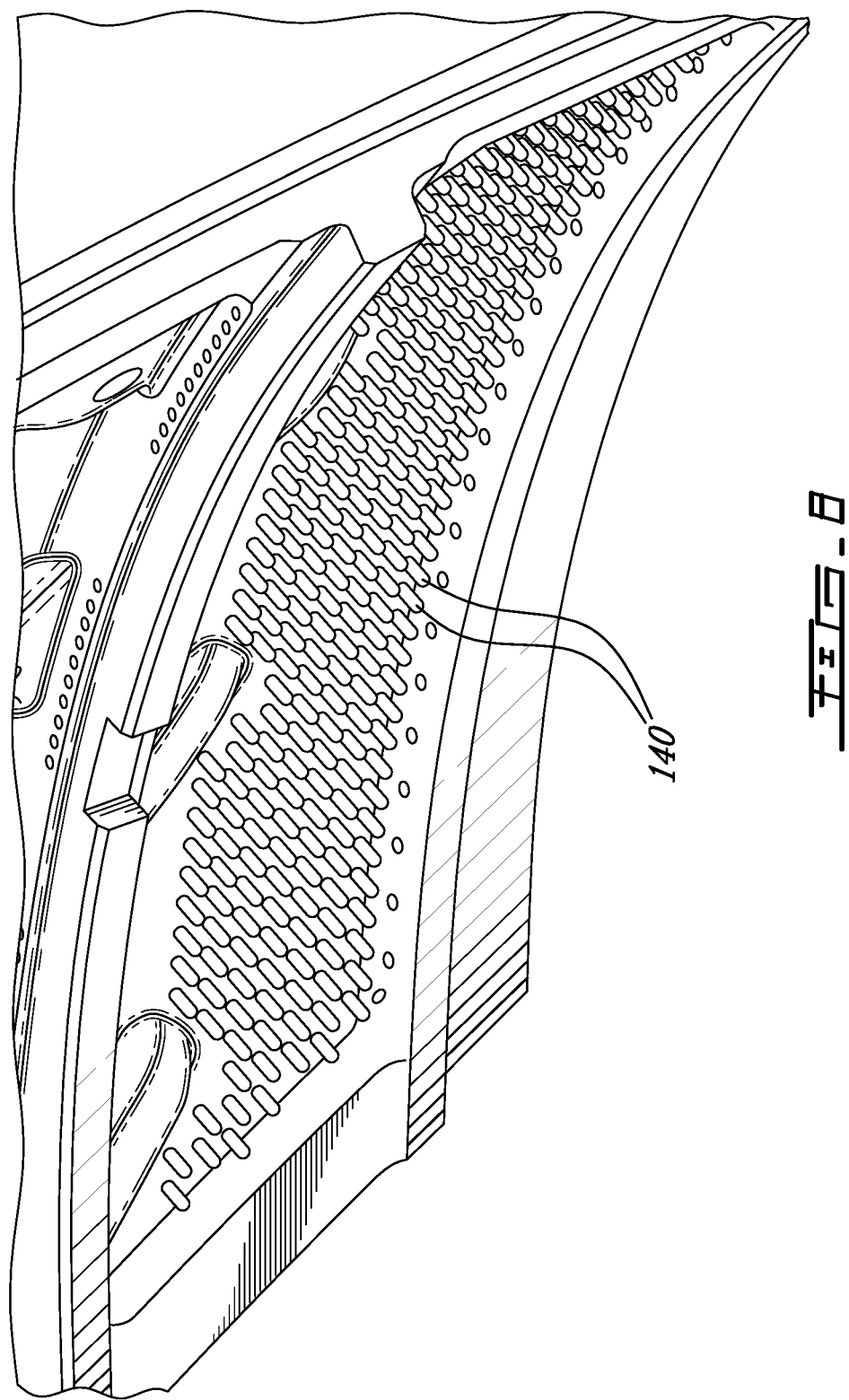
FIG. 8 is an oblique view of a variant of protrusions of a heat sink portion.

FIGS. 8 and 9 present alternate potential protrusion shapes to those described above, which may be preferred in alternate embodiments. FIG. 8, for instance, presents an array of standoffs in the form of pins 140 oriented generally normal to the cooling surface from which they extend. Such protrusions 140 may be more difficult to cast than protrusions 40 which have a smaller height to width ratio, but may be better optimized to flows which are generally directed along the surface, as opposed to flows which are oriented to and from the surface. In FIG. 9, the protrusions 240 are in the form of two longitudinal ribs. These protrusion shapes may be less adapted to multi-directional cooling, but multi-directional cooling may not be a requirement in some embodiments.

In one possible geometry, such as shown in FIGS. 2 and 4, the alphanumeric symbols of the part identification was placed in rectangular spaces of roughly 0.070 in×0.090 in, with the protrusion extending roughly 0.020 normal to the surface. It will be understood that this is but one possible example, and that the corresponding dimensions can vary greatly in alternate embodiments. Indeed, the corresponding dimensions can be selected based on 1) the size of the part and 2) the thermal behavior/cooling flow configuration of the part.

The above description is meant to be exemplary only, and one skilled in the art will recognize that changes may be made to the embodiments described without departing from the scope of the invention disclosed. For example, instead of taking the shape of alphanumerical characters, the protrusions forming an identifier can form the shape of a bar code, or matrix code, to name some examples. It will be noted that the area of the part bearing the protrusions is recessed from a surrounding or adjacent portion of the part in all the embodiments illustrated. This feature is optional, and in some alternate embodiments, the area or the part bearing the protrusions may not be recessed, or may even protrude from a surrounding area of the part, for instance. In some embodiments, the identifier may have a heat transfer area at least equal to the area of the protrusions replaced by the identifier. In some embodiments, the CAD model formed when designing the part, which can be a 3D model for example, may be used in manufacturing, to make a part based on the CAD model. Although several embodiments presented herein use compressor bleed air as the cooling medium, it will be understood that in alternate embodiments, the cooling medium can be a liquid, or another form of cooling gas, for instance. Still other modifications which fall within the scope of the present invention will be apparent to those skilled in the art, in light of a review of this disclosure, and such modifications are intended to fall within the appended claims.

The invention claimed is:

1. A gas turbine engine part, the part comprising a heat sink portion having a surface having a plurality of protrusions distributed over an area of the surface, the protrusions projecting away from the surface, some of the protrusions being adjacent to one another and collectively forming an identifier, and other ones of the protrusions not forming the identifier.

2. The gas turbine engine part of claim 1 wherein the protrusions collectively forming the identifier have an alphanumerical shape in the plane of the surface.

3. The gas turbine engine part of claim 2 wherein the identifier includes at least one of a part number preceded by P/N, a class number preceded by CL, and a serial number preceded by S/N.

4. The gas turbine engine part of claim 1 wherein the protrusions collectively forming the identifier have a height within 50% to 150% of a height of the protrusions not forming the identifier.

5. The gas turbine engine part of claim 2 wherein the protrusions have a height within 50% and 150% of a font line width of the alphanumerical shape.

6. The gas turbine engine part of claim 1 wherein the protrusions not forming the identifier are cruciate.

7. The gas turbine engine part of claim 1 wherein the protrusions not forming the identifier are evenly distributed relative to one another.

8. The gas turbine engine part of claim 1 being an annular component, the heat sink portion surface being an annular surface opposite to a gas path.

9. The gas turbine engine part of claim 1 being a turbine stator component.

10. The gas turbine engine part of claim 1 being a shroud segment.

11. The gas turbine engine part of claim 1 wherein the area of the surface is recessed relative to a surrounding portion of the part.

12. The gas turbine engine part of claim 1 being an integrally cast part.

13. A method of cooling a gas turbine engine part having a heat sink portion having a surface having a plurality of protrusions distributed over an area of the surface, the protrusions projecting away from the surface, some of the protrusions collectively forming an identifier, the method comprising:

directing a flow of cooling air into contact with the plurality of protrusions.

14. The method of claim 13 wherein the flow of cooling air is directed in impingement against the surface and the protrusions.

15. A gas turbine engine comprising a main gas path extending in serial flow communication across a compressor section for pressurizing air, a combustor for mixing fuel into the air, igniting the fuel, and generating hot combustion gases, and a turbine section for extracting energy from the combustion gases, the turbine section having a component receiving heat from the hot combustion gases, the turbine component having an annular surface opposite the main gas path, the annular surface being positioned in a cavity, the annular surface having a plurality of protrusions distributed over an area of the annular surface, the protrusions projecting away from the surface, at least some of the protrusions collectively forming an identifier; inlet apertures leading into the cavity, and outlet apertures leading out of the cavity.

16. The gas turbine engine of claim 15 further comprising a bleed air path directing a flow of pressurized air from the compressor to the inlet apertures, and thence into contact with the annular surface and the protrusions.

17. The gas turbine engine of claim 15 wherein the outlet apertures lead into the main gas path.

18. The gas turbine engine of claim 15 wherein other ones of the protrusions do not contribute to forming the identifier.

19. The gas turbine engine of claim 18 wherein the protrusions collectively forming the identifier have a height within 50% to 150% of a height of the protrusions not forming the identifier.

20. The gas turbine engine of claim 17 wherein some of the protrusions form an alphanumerical shape, and have a height within 50% and 150% of a font line width of the alphanumerical shape.

* * * * *